Oct. 29, 1935.  F. N. DEL PONTE  2,019,000
PHONOGRAPH PICKUP
Filed April 29, 1933
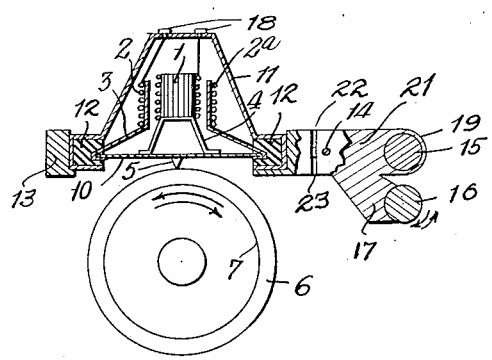
INVENTOR.
F.N. Del Ponte
BY Marks & Clerk
ATTORNEYS.

Patented Oct. 29, 1935

2,019,000

UNITED STATES PATENT OFFICE 2,019,000

PHONOGRAPH PICKUP

Federico Nicolas Del Ponte, Buenos Aires, Argentina

Application April 29, 1933, Serial No. 668,658

2 Claims. (Cl. 179—100.41)

This invention relates to improvements in apparatus for recording and reproducing sound and has for its object to provide an improved electrical device of this character of simple and compact construction.

The invention is illustrated in the accompanying drawing in which the figure is a sectional view through a reproducing and recording device.

Referring to the drawing in detail a record cylinder 6 is supported by a mandrel 7 and the latter may run either clockwise or anti-clockwise, as is desired.

The reproducing or recording device includes a metal casing 2ª flared at its lower end as at 3, its upper portion being cylindrical and having a coil 2 thereon. Concentrically within the cylindrical portion a small electro-magnet 1, either hollow or solid, of mild steel, is placed which is supported on the diaphragm 10 carrying the recording stylus 5 by means of the legs 4. The diaphragm 10 is carried by the flared end 3 of the casing.

The casing 2ª and diaphragm 10 are enclosed in and protected by a metal cover 11 having in its upper portion two terminals 18, connected with the coil of the electromagnet and the coil 2. The casing 2ª and cover 11 are mounted on a resilient check 12 of such a shape as will make it impossible for the mechanical vibrations of the support to be transmitted to the diaphragm 10.

The device is supported in position above the cylinder 6 by means of a metal ring 13 associated with the joined arm 21 which may have a horizontal displacement parallel to the axis of the cylinder, sliding along the cylindrical guide 15 by means of the ring 19, this movement being effected by a screw segment 17 associated with arm 21 engaging a screw 16 which is turned together with the cylinder 7 by a suitable driving gear in either direction.

The arm 21 is jointed at 14 and due to the clearance spaces 22 and 23 makes it possible for the diaphragm and its arm to always rest on the surface of the cylinder 6 even though the latter may not be of true cylindrical form. On the other, upon lifting the ring 13 the threads at 16 and 17 may be disconnected and, consequently, the support and the diaphragm may be freely moved.

What is claimed is:

1. In an apparatus for recording and reproducing sound comprising a casing having one end of substantially cylindrical form and the other end flared outwardly, a diaphragm located in the flared end of the casing, a stylus carried by said diphragm, a magnet located in concentrically spaced relation within the cylindrical portion of the casing, legs carried by the magnet and supported on said diaphragm, and coils surrounding the magnet and the cylindrical portion of said casing.

2. An arrangement as claimed in claim 1, characterized by the provision of a cover enclosing the cylindrical portion of the casing, and a holder common to the cover and casing.

FEDERICO NICOLAS DEL PONTE.